United States Patent
Kuwahara et al.

(10) Patent No.: US 11,044,226 B2
(45) Date of Patent: Jun. 22, 2021

(54) CONVERSION DEVICE, COMMUNICATION SYSTEM, METHOD FOR CONTROLLING CONVERSION DEVICE, AND METHOD FOR CONTROLLING COMMUNICATION SYSTEM

(71) Applicant: MURATA MACHINERY, LTD., Kyoto (JP)

(72) Inventors: Tetsuya Kuwahara, Kyoto (JP); Eiji Sugihara, Kyoto (JP); Yuya Kamitake, Nara (JP); Masaaki Toda, Ise (JP)

(73) Assignee: MURATA MACHINERY, LTD., Kyoto (JP)

( * ) Notice: Subject to any disclaimer, the term of this patent is extended or adjusted under 35 U.S.C. 154(b) by 69 days.

(21) Appl. No.: 16/480,689

(22) PCT Filed: Dec. 19, 2017

(86) PCT No.: PCT/JP2017/045611
§ 371 (c)(1),
(2) Date: Jul. 25, 2019

(87) PCT Pub. No.: WO2018/142792
PCT Pub. Date: Aug. 9, 2018

(65) Prior Publication Data
US 2019/0386952 A1     Dec. 19, 2019

(30) Foreign Application Priority Data
Jan. 31, 2017   (JP) .............................. JP2017-015557

(51) Int. Cl.
*H04W 4/00*     (2018.01)
*H04L 29/12*     (2006.01)
(Continued)

(52) U.S. Cl.
CPC .......... *H04L 61/2015* (2013.01); *H04L 12/46* (2013.01); *H04W 4/35* (2018.02); *H04W 8/26* (2013.01); *H04L 61/6022* (2013.01)

(58) Field of Classification Search
CPC ..... H04W 80/04; H04W 84/12; H04W 88/06; H04W 88/08; H04W 84/18
See application file for complete search history.

(56) References Cited

U.S. PATENT DOCUMENTS

| | | | |
|---|---|---|---|
| 8,660,129 B1* | 2/2014 | Brendel ................. | H04L 67/10 370/397 |
| 2008/0059611 A1* | 3/2008 | Kiji ..................... | H04L 61/2015 709/220 |
| 2012/0250686 A1* | 10/2012 | Vincent ................. | H04L 45/64 370/392 |

FOREIGN PATENT DOCUMENTS

| | | |
|---|---|---|
| JP | 4367067 B2 | 11/2009 |
| JP | 2010-239281 A | 10/2010 |
| JP | 5135447 B2 | 2/2013 |

OTHER PUBLICATIONS

English translation of Official Communication issued in corresponding International Patent Application No. PCT/JP2017/045611, dated Aug. 15, 2019.

(Continued)

*Primary Examiner* — Siren Wei
(74) *Attorney, Agent, or Firm* — Keating & Bennett, LLP

(57) ABSTRACT

A conversion device for interconversion of wired communication and wireless communication includes a wired IF, a wireless IF, a converter that retains a first MAC address of a communication terminal connected to the wired IF and uses the first MAC address to convert wired communication in which the communication terminal is a destination into wireless communication and convert wireless communication in which the communication terminal is a source into (Continued)

wired communication between the wired IF and the wireless IF, and a controller that receives a communication packet including an IP address and a second MAC address through the wireless IF, and when the second MAC address included in the received communication packet is the same as the first MAC address, sets the IP address included in the received communication packet as an IP address of the conversion device.

10 Claims, 11 Drawing Sheets

(51) Int. Cl.
*H04W 4/35* (2018.01)
*H04L 12/46* (2006.01)
*H04W 8/26* (2009.01)

(56) References Cited

OTHER PUBLICATIONS

Official Communication issued in International Patent Application No. PCT/JP2017/045611, dated Mar. 27, 2018.

* cited by examiner

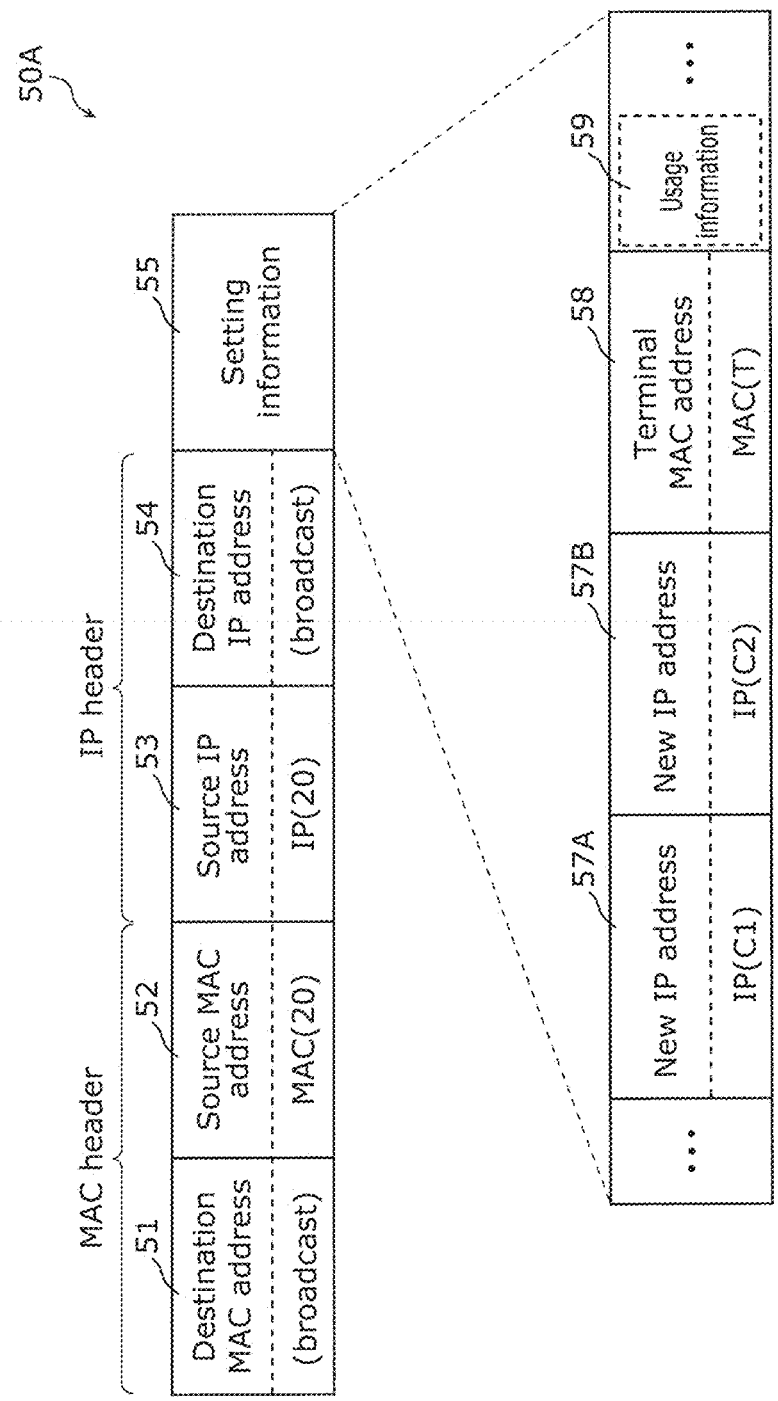

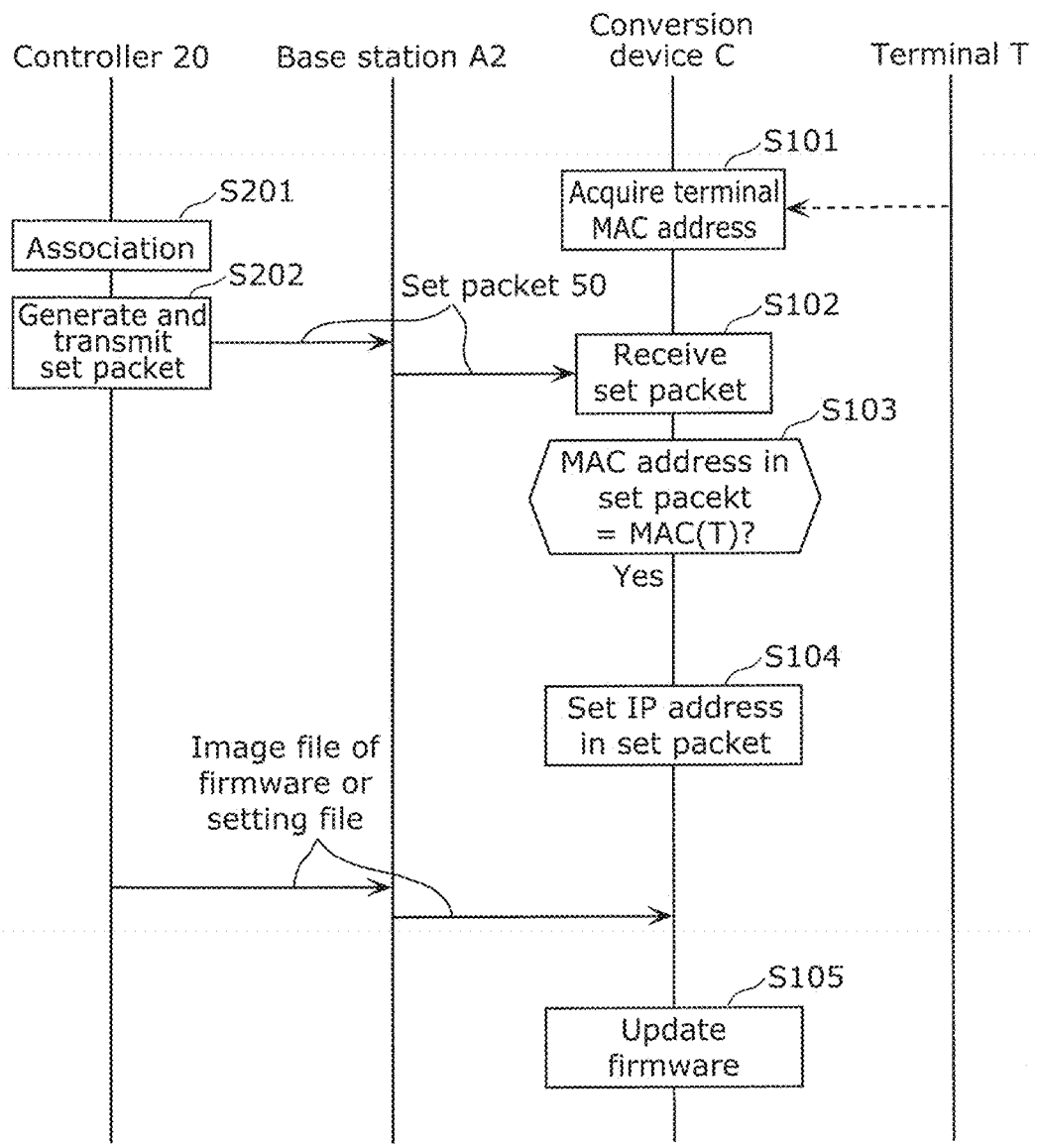

FIG. 9

| Conversion device ID | Terminal MAC address | New IP address | New IP address |
|---|---|---|---|
| C1 | MAC(T1) | IP(C11) | IP(C12) |
| C2 | MAC(T2) | IP(C21) | IP(C22) |
| ⋮ | ⋯ | ⋮ | ⋯ |
| Cn | MAC(Tn) | IP(Cn1) | IP(Cn2) |

CONVERSION DEVICE, COMMUNICATION SYSTEM, METHOD FOR CONTROLLING CONVERSION DEVICE, AND METHOD FOR CONTROLLING COMMUNICATION SYSTEM

BACKGROUND OF THE INVENTION

1. Field of the Invention

The present invention relates to a conversion device, a communication system, a method for controlling a conversion device, and a method for controlling a communication system.

2. Description of the Related Art

Automated guided vehicles for transport of goods or for other purposes are used in a facility such as a factory. The automated guided vehicles communicate with, for example, a controller that controls travel of the automated guided vehicles so as to receive control information about travel from the controller and to run in accordance with the received control information. The automated guided vehicles communicate with the controller through wireless communication that sequentially uses a plurality of base station terminals (hereinafter, also simply referred to as "base stations") that are disposed to cover the aforementioned facility.

In the case where such an automated guided vehicle or the like is provided with a wired communication interface, a conversion device for interconversion of wired communication and wireless communication can be used. For example, a Wi-Fi converter is known as a conversion device for interconversion of wired communication through Ethernet and wireless communication through Wi-Fi.

In the case where the conversion device performs an operation for interconverting wired communication and wireless communication, there is no need to set an Internet Protocol (IP) address to the conversion device. However, in the case where the conversion device transmits and receives predetermined data to and from other communication devices (e.g., controller), it is necessary to set an IP address to the conversion device.

Various techniques for automatically assigning IP addresses that are used for communication in IP networks are already under consideration. For example, according to the Dynamic Host Configuration Protocol (DHCP), a DHCP server assigns and sets an IP address to a communication terminal in response to a request to acquire an IP address from the communication terminal.

Japanese Unexamined Patent Application Publication No. 2010-239281 discloses a technique that enables a communication terminal to automatically set its IP address when a DHCP server cannot be used.

However, with the technique disclosed in Japanese Unexamined Patent Application Publication No. 2010-239281, the communication terminal needs to determine, through communication, whether a temporary IP address that is attempted to be used is not used by other communication terminals. If the aforementioned temporary IP address is used by another terminal, the communication terminal needs to set and determine another temporary IP address again, and therefore there is a problem that the amount of processing and the processing time will increase.

SUMMARY OF THE INVENTION

Preferred embodiments of the present invention provide conversion devices or the like that each reduce communication required to set an IP address in comparison with that in conventional cases.

A conversion device according to a preferred embodiment of the present invention is a conversion device for interconversion of wired communication and wireless communication. The conversion device includes a wired interface, a wireless interface, a converter that retains a first media access control (MAC) address of a communication terminal that is connected to the wired interface, and converts wireless communication in which the communication terminal is a destination into wired communication and converts wired communication in which the communication terminal is a source into wireless communication between the wired interface and the wireless interface through the first MAC address, and a controller that (a) receives a communication packet including an internet protocol (IP) address and a second MAC address through the wireless interface, and (b) when the second MAC address included in the received communication packet matches the first MAC address, sets the IP address included in the received communication packet as an IP address of the conversion device.

Thus, the conversion device is able to properly assign an IP address to itself in situations where the conversion device is not assigned an IP address but the MAC address of the communication terminal is managed. The conversion device is a device to convert communication, and therefore may be operated in a state in which the conversion device is not assigned an IP address and its MAC address is also not managed. In that case, the controller has no information to individually identify the conversion device. In view of this, the MAC address of equipment that is connected to the wired interface of the conversion device is used as an identifier to set the IP address of the conversion device. Also, the controller intensively manages the IP addresses that is to be assigned to the conversion devices, thus avoiding the possibility that processing and time to assign an IP address will increase as in Japanese Unexamined Patent Application Publication No. 2010-239281. In this way, the conversion device is able to reduce communication required to set an IP address in comparison with that in conventional cases.

The conversion device further includes a volatile memory that includes a first storage area to store an IP address that is being used for IP communication by the conversion device, and a nonvolatile memory that includes a second storage area to store an IP address that is read at startup of the conversion device and used for IP communication by the conversion device after the startup, wherein in (a), the controller receives the communication packet that further includes usage information indicating whether the IP address included in the communication packet is used temporarily or permanently, and in (b), (c) when the usage information indicates that the IP address is used temporarily, the controller stores the second MAC address in only the first storage area out of the first storage area and the second storage area, and (d) when the usage information indicates that the IP address is used permanently, the controller stores the second MAC address in both of the first storage area and the second storage area.

Thus, the controller is able to determine whether the IP address assigned by the controller is used temporarily or permanently by the conversion device. In this way, there is an advantage that the controller is able to take the initiative to determine handling of the IP address.

The conversion device may further include an updater to receive an image file of firmware on the conversion device through IP communication using the IP address set by the controller and restart the conversion device after the receipt to cause the conversion device to operate in accordance with the firmware based on the received image file.

Thus, the conversion device is able to update firmware with the IP address assigned by the controller.

The conversion device may further include an updater to receive a setting file of the conversion device through IP communication using the IP address set by the controller, update setting data on the conversion device after the receipt, and restart the conversion device to cause the conversion device to operate in accordance with settings in the received setting file.

Thus, the conversion device is also able to update the settings with the IP address assigned by the controller.

A conversion device according to another preferred embodiment of the present invention is a communication system that includes a plurality of conversion devices described above and a controller. The controller includes a holder to hold one or more IP addresses that are to be assigned to the plurality of the conversion devices, an associator to associate the one or more IP addresses held in the holder with the first MAC addresses of the communication terminals connected to the wired interfaces of the plurality of the conversion devices, and a transmitter to transmit each of the one or more IP addresses held in the holder and the first MAC address that is associated with this IP address by the associator.

Thus, the communication system transmits an IP address that is to be assigned to the conversion device to the conversion device in association with the MAC address of the terminal that is connected to the conversion device. This allows the conversion device to use the MAC address of the terminal connected thereto as an identifier to acquire an IP address that is to be assigned to itself and to set this IP address.

Also, the holder holds at least the same number of IP addresses as the number of the plurality of the conversion devices as the one or more IP addresses, and the associator associates the same number of IP addresses held in the holder in a one-to-one relationship with the first MAC addresses of the communication terminals connected to the wired interface of each of the plurality of the conversion devices.

Thus, in the communication system, a situation has arisen where each of the plurality of conversion devices is capable of IP communication with the controller by using the assigned IP address. The controller is able to transmit an image file of firmware to the plurality of conversion devices in parallel through this IP communication.

Also, the transmitter transmits, as the communication packet, one communication packet that includes a plurality of IP addresses, among the same number of IP addresses held in the holder, and the first MAC addresses that are associated with these plurality of IP addresses by the associator.

Thus, in the communication system, a plurality of IP addresses that are to be assigned to a plurality of conversion devices are able to be transmitted and set to the plurality of conversion devices in one packet transmission. This reduces the amount of communication on the network.

Also, the holder holds one IP address as the one or more IP addresses, the associator associates the one IP address held in the holder with one conversion device among the plurality of conversion devices, the transmitter transmits the one IP address held in the holder and the first MAC address that is associated with the one IP address by the associator to cause the transmitted one IP address to be stored in a storage area of the volatile memory of the one conversion device, and after an image file of firmware on the one conversion device is transmitted through IP communication using the one IP address, and the one conversion device is restarted and operated in accordance with the firmware, the associator associates the one IP address held in the holder with a conversion device different from the one conversion device among the plurality of conversion devices.

Thus, in the communication system, a single IP address is shared and assigned to a plurality of conversion devices. This allows each of the plurality of conversion devices to sequentially receive an image file of firmware and update the firmware. Accordingly, the firmware on the plurality of conversion devices is able to be updated with use of reduced number of IP addresses.

A method for controlling a conversion device according to a preferred embodiment of the present invention is a method for controlling a conversion device for interconversion of wired communication and wireless communication. The method includes a conversion step of, by using a first MAC address of a communication terminal connected to a wired interface, converting wireless communication in which the communication terminal is a destination into wired communication and converting wired communication in which the communication terminal is a source into wireless communication between the wired interface and a wireless interface, and a control step of (a) receiving a communication packet that includes an IP address and a second MAC address through the wireless interface, and (b) when the second MAC address included in the communication packet matches the first MAC address, setting the IP address included in the received communication packet as an IP address of the conversion device.

This achieves advantageous effects similar to those of the above-described conversion device.

Also, a method for controlling a conversion device according to another preferred embodiment of the present invention is a method for controlling the above-described communication system. The method includes a holding step of holding one or more IP addresses that are to be assigned to a plurality of the conversion devices, an association step of associating the one or more IP addresses held in the holding step with the first MAC addresses of the communication terminals connected to the wired interfaces of the plurality of the conversion devices, and a transmission step of transmitting each of the one or more IP addresses held in the holding step and the first MAC address that is associated with this IP address in the association step.

This achieves advantageous effects similar to those of the above-described conversion device.

The conversion devices, communication systems, and converting methods according to preferred embodiments of the present invention each reduce communication required to set an IP address in comparison with that in conventional cases.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6 is an explanatory diagram illustrating another form of the set packet according to Preferred Embodiment 1 of the present invention.

FIG. 7 is a sequence diagram illustrating a communication sequence of a communication system that includes processing performed by the controller and the conversion device according to Preferred Embodiment 1 of the present invention.

FIG. 8 is an explanatory diagram illustrating an address assignment table of the controller according to Preferred Embodiment 2 of the present invention.

FIG. 9 is an explanatory diagram illustrating another form of the address assignment table of the controller according to Preferred Embodiment 2 of the present invention.

DETAILED DESCRIPTION OF THE PREFERRED EMBODIMENTS

Preferred embodiments will be described in detail hereinafter with reference to the drawings.

Note that each preferred embodiment described below shows a preferable specific example of the present invention. Thus, numerical values, shapes, materials, structural elements, locations and connections of the structural elements, steps, a sequence of steps, and so on shown in the following preferred embodiments are illustrative only and not intended to limit the present invention. Among the structural elements described in the following preferred embodiments, those that are not recited in independent claims, which indicate the broadest concept of the present invention, are described as arbitrary structural elements. Note that identical structural elements are given the same reference sign, and a description thereof may be omitted.

Preferred Embodiment 1

The present preferred embodiment describes a conversion device or the like that is able to reduce communication required to set an IP address in comparison with that in conventional cases.

The conversion device described in the present preferred embodiment can be implemented as, for example, a conversion device that is connected to and used in an automated guided vehicle that communicates with a controller through wireless communication that sequentially uses a plurality of base stations disposed to cover communication in a facility. It is, however, noted that a communication device including a wired communication interface, such as a personal computer, one of various manufacturing devices or one of various measuring devices may be applied, instead of the automated guided vehicle described in the present preferred embodiment.

Figure 1:
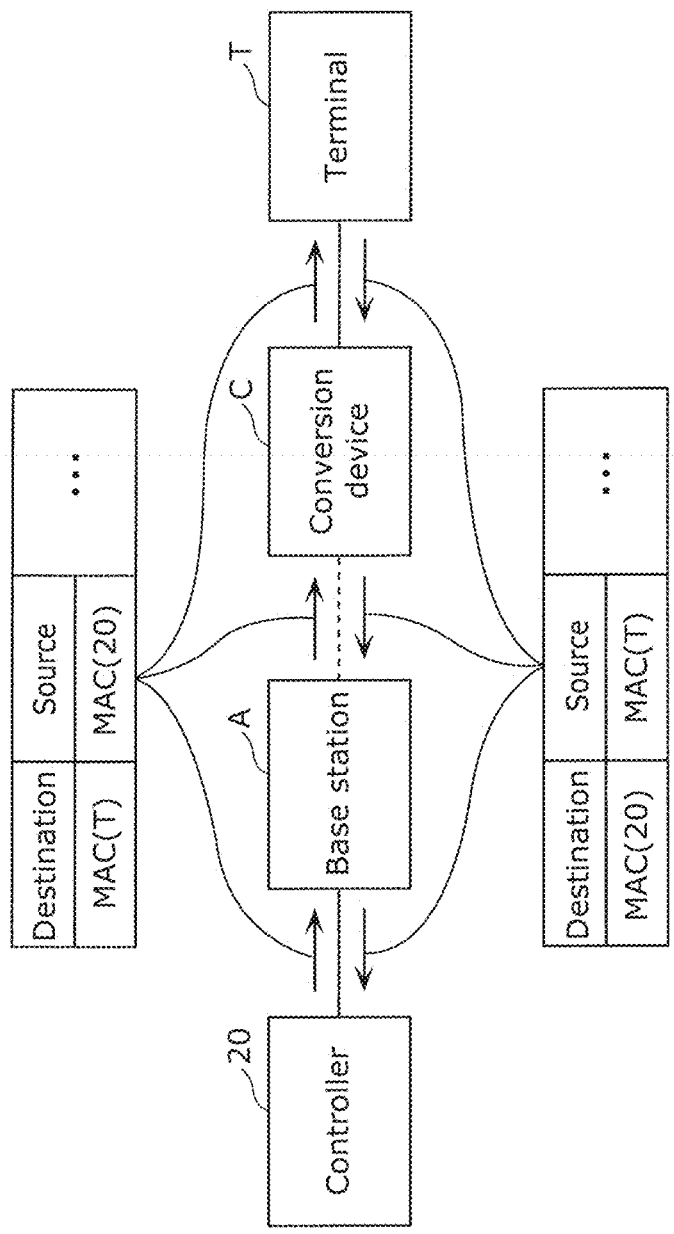
FIG. 1 is a network configuration diagram of a communication system that includes a conversion device according to Preferred Embodiment 1 of the present invention.

FIG. 1 is a network configuration diagram of a communication system 1 that includes a conversion device C according to the present preferred embodiment.

As illustrated in FIG. 1, the communication system 1 includes a controller 20, a base station A, the conversion device C, and a terminal T. The communication system 1 is a system that operates the terminal T under the control of the controller 20 through a network. The conversion device C and the terminal T are assumed to be connected in a one-to-one relationship, and the system may include a plurality of sets of conversion devices C and terminals T.

Figure 2:
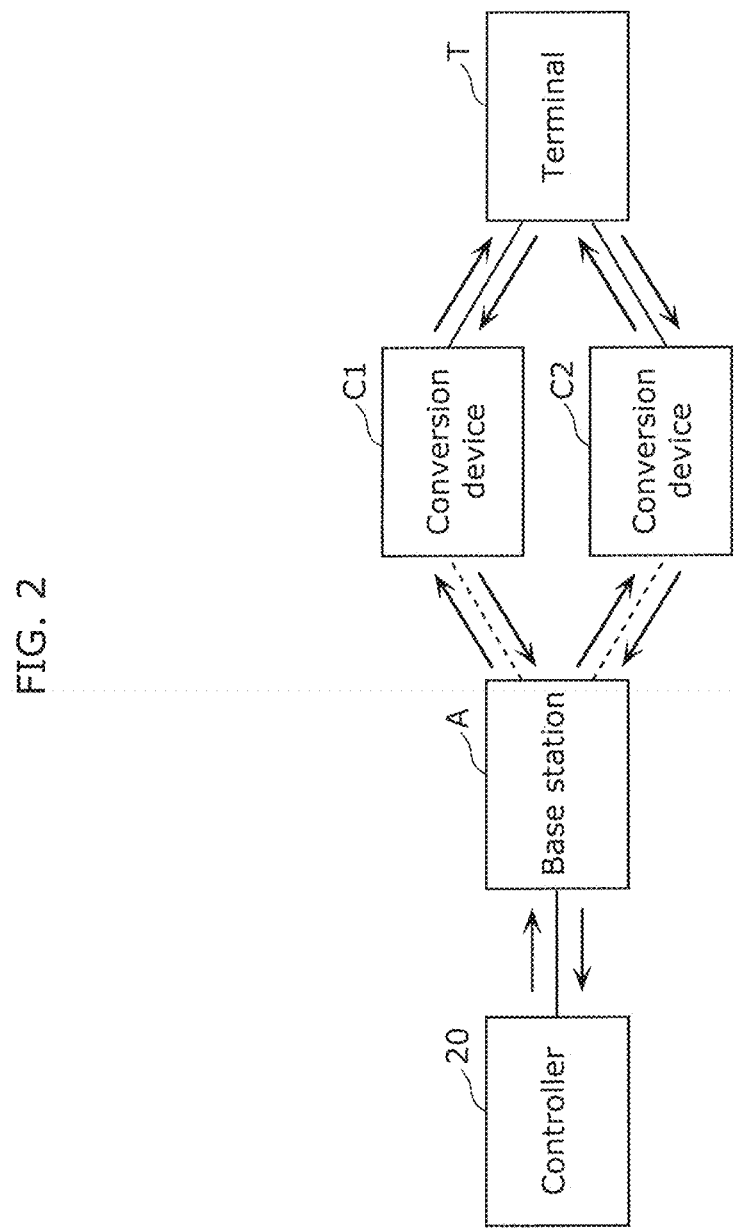
FIG. 2 is a network configuration diagram of another form of the communication system that includes the conversion device according to Preferred Embodiment 1 of the present invention.

Although the present preferred embodiment describes a case in which the conversion device C and the terminal T are connected in a one-to-one relationship, two conversion devices C and one terminal T may be connected to one another if the terminal T includes two wired interfaces (see FIG. 2).

Referring back to FIG. 1, the controller 20 and the base station A are communicably connected to each other through wired communication, and the conversion device C and the terminal T are communicably connected to each other through wired communication. The base station A and the conversion device C are communicably connected to each other through wireless communication. Note that wired interface communication standards are, for example, Ethernet (IEEE 802.3). Wireless interface communication standards are, for example, Wi-Fi (registered trademark) (IEEE 802.11a, 11b, 11g, 11n).

The controller 20 is a controller that controls operations of the conversion device C and the terminal T. Specifically, the controller 20 is configured or programmed to assign an IP address to the conversion device C and to transmit an image file of firmware on the conversion device C to the conversion device C. The controller 20 is also preferably configured or programmed to control operations of the terminal T (e.g., a running operation of the terminal T serving as the automated guided vehicle). The controller 20 includes a wired interface, is communicably connected to the conversion device C and the terminal T through the wired interface, and transmits and receives various types of data.

The base station A is a base station terminal that includes a wired interface and a wireless interface. The base station A is communicably connected to the controller 20 through the wired interface. The base station A is also communicably connected to the terminal T through the wireless interface. The wireless interface of the base station A functions as, for example, an access point (AP) to the Wi-Fi.

The conversion device C is a conversion device that includes a wireless interface and a wired interface. The conversion device C interconverts wired communication and wireless communication. The wireless interface of the conversion device C functions as, for example, a station (STA) of the Wi-Fi. The conversion device C is a conversion device, or so-called a Wi-Fi converter, that is used to communicably connect the terminal T, which does not include a wireless interface, to the base station A.

The conversion device C converts communication using a MAC address of the terminal T, which is equipment connected through the wired interface. When a frame with a destination MAC address MAC(T) is received from the wireless interface as in the frame format illustrated in FIG. 1, the conversion device C transfers this frame to the terminal T through the wired interface. Also, when a frame transmitted from the terminal T is received from the wired interface, the conversion device C transfers the received frame to the base station A through the wireless interface.

The terminal T is a terminal device that includes a wired interface. The terminal T is capable of wired communication through the wired interface. The terminal T communicates with the controller 20 through the base station A and the conversion device C, using the conversion of communication performed by the conversion device C.

The terminal T is, for example, an automated guided vehicle that does not include a wireless interface but includes a wired interface and operates under the control of the controller 20 while communicating with the controller 20 through the wired interface. Specific examples of operations of the automated guided vehicle include running, transporting goods, and performing processing for maintenance of the automated guided vehicle.

For the automated guided vehicles that move from one place to another while running, wireless communication is convenient. Since it is assumed that the automated guided vehicles are used in a facility such as a factory, it is common to use automated guided vehicles that each include a relatively reliable wired interface because of, for example, the need not to reduce but maintain the reliability of communication and the need to avoid malfunctions as much as possible. In view of this, the conversion device C is used to convert wired communication in each automated guided vehicle into wireless communication.

Incidentally, approximately several hundreds of automated guided vehicles are often operated in a facility such as a factory. Since IP communication is used for the automated guided vehicles to be controlled by the controller 20, the automated guided vehicles are assigned IP addresses, and their MAC addresses are also managed. On the other hand, the conversion device C is a device that converts communication, and therefore it is not absolutely necessary to assign an IP address to the conversion device C and to manage the MAC address of the conversion device C. Also, like terminals T, approximately several hundreds of conversion devices C are disposed. Thus, the conversion devices C may be operated in a state in which they are not assigned IP addresses.

In such an operational situation, data communication relating to the control of operations of the conversion device C (e.g., transfer of an image file of firmware for firmware updating) is assumed to be performed. The conversion device C is incapable of IP communication if no IP address is set to the conversion device C.

Thus, there is demand for the ability to properly assign an IP address to the conversion device C so as to enable data communication between the controller 20 and the conversion device C, in situations where the conversion device C is not assigned an IP address but the MAC address of the automated guided vehicle serving as the terminal T is managed.

The conversion device C according to the present preferred embodiment is a conversion device whose IP address is able to be properly set using unique information (e.g., MAC address) about the terminal T that is connected through the wired interface. The operations of the conversion device C will be described in detail hereinafter.

Figure 3:
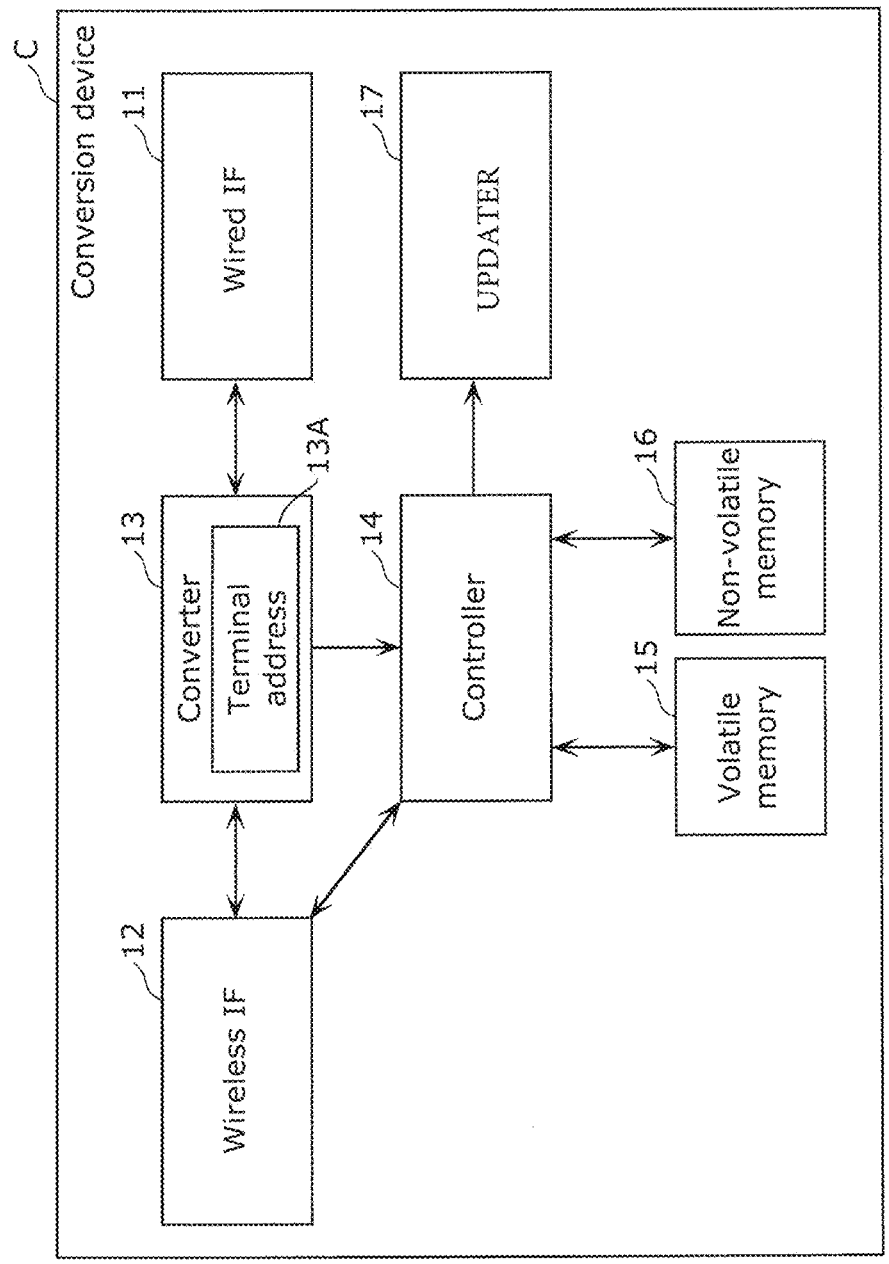
FIG. 3 is a block diagram illustrating a configuration of the conversion device according to Preferred Embodiment 1 of the present invention.

FIG. 3 is a block diagram illustrating a configuration of the conversion device C according to the present preferred embodiment.

As illustrated in FIG. 3, the conversion device C includes a wired interface (IF) 11, a wireless IF 12, a converter 13, a controller 14, a volatile memory 15, a nonvolatile memory 16, and an updater 17.

The wired IF 11 is a wired interface that is communicably connected to the terminal T through wired communication.

The wireless IF 12 is a wireless interface that is communicably connected to the base station A through wireless communication. The wireless IF 12 functions as an STA of the Wi-Fi.

The converter 13 is a processor that interconverts wired communication and wireless communication. Specifically, the converter 13 retains the MAC address (hereinafter, also referred to as a "first MAC address") of the terminal T, which is a communication terminal connected to the wired IF 11, and converts communication using the first MAC address. More specifically, the converter 13 converts wireless communication in which the terminal T is a destination into wired communication and converts wired communication in which the terminal T is a source into wireless communication between the wired IF 11 and the wireless IF 12 (see FIGS. 1 and 2). The converter 13 retains the MAC address of the terminal T connected through the wired IF 11 as a terminal address 13A and uses this terminal address 13A to determine a destination address in the MAC header and to convert the above-described communication.

The controller 14 is a processor that performs processing for setting an IP address to the conversion device C. Specifically, the controller 14 (a) receives a communication packet that includes an IP address and a MAC address (which corresponds to a second MAC address) through the wireless IF 12, and (b) when the second MAC address included in the received communication packet matches the first MAC address, sets the IP address included in the received communication packet as the IP address of the conversion device C. Note that the above-described communication packet is also referred to as a "set packet." The IP address of the conversion device C refers to at least the IP address that is currently being used for IP communication by the conversion device C, and it may further refer to the IP address that is used after startup of the conversion device C.

The volatile memory 15 is a storage device that includes a storage area (which corresponds to a first storage area) to store the IP address that is currently being used for IP communication by the conversion device C. The IP address stored in the first storage area of the volatile memory 15 is used for IP communication by the conversion device C. The contents of the volatile memory 15 are erased at restart or power-off of the conversion device C.

The nonvolatile memory 16 is a storage device that includes a storage area (which corresponds to a second storage area) to store the IP address that is used for IP communication after startup of the conversion device C. The IP address stored in the second storage area of the nonvolatile memory 16 is read and stored in the first storage area of the volatile memory 15 at startup of the conversion device C and is used for IP communication after the startup.

The updater 17 is a processor that updates firmware on the conversion device C or settings of the conversion device C. Specifically, the updater 17 receives an image file of firmware on the conversion device C through IP communication using the IP address set by the controller 14 and restarts the conversion device C after the receipt so as to cause the conversion device C to operate in accordance with the firmware based on the received image file.

The updater 17 also receives setting data on the conversion device C through IP communication using the IP address set by the controller 14, updates the settings of the conversion device C after the receipt, and restarts the conversion device C so as to cause the conversion device C updated with the received setting data to operate.

Note that the controller 14 may store the second MAC address in only the first storage area out of the first and second storage areas. This enables an operation in which an IP address for IP communication, which is necessary for the updater 17 to receive an image file of firmware, is set and this IP address is erased after completion of firmware updating. This operational method is also referred to as "temporary use of the IP address." The operation of temporary use has the advantage that a step of erasing the set IP address one by one can be omitted in the case where firmware on a plurality of terminals T is sequentially updated.

The controller 14 may also store the second MAC address in both of the first and second storage areas. This enables an operation in which an IP address for IP communication, which is necessary for the updater 17 to update firmware, is set and the set IP address continues to be used after that. This operational method is also referred to as "permanent use of the IP address." The operation of permanent use has the advantage that several hundreds of terminals T can continue to use their IP addresses even after firmware updating.

The controller 14 may also receive a communication packet that further includes usage information indicating whether the IP address included in the communication packet is used temporarily or permanently. In that case, (c) when the usage information indicates that the IP address is used temporarily, the second MAC address may be stored in only the first storage area out of the first and second storage areas, and (d) when the usage information indicates that the IP address is used permanently, the second MAC address may be stored in both of the first and second storage areas. This operation has the advantage that whether the IP address is used temporarily or permanently is able to be selected based on the usage information included in the communication packet.

Note that the converter 13, the controller 14, and the updater 17 may be implemented by, for example, dedicated hardware or processors.

Figure 4:
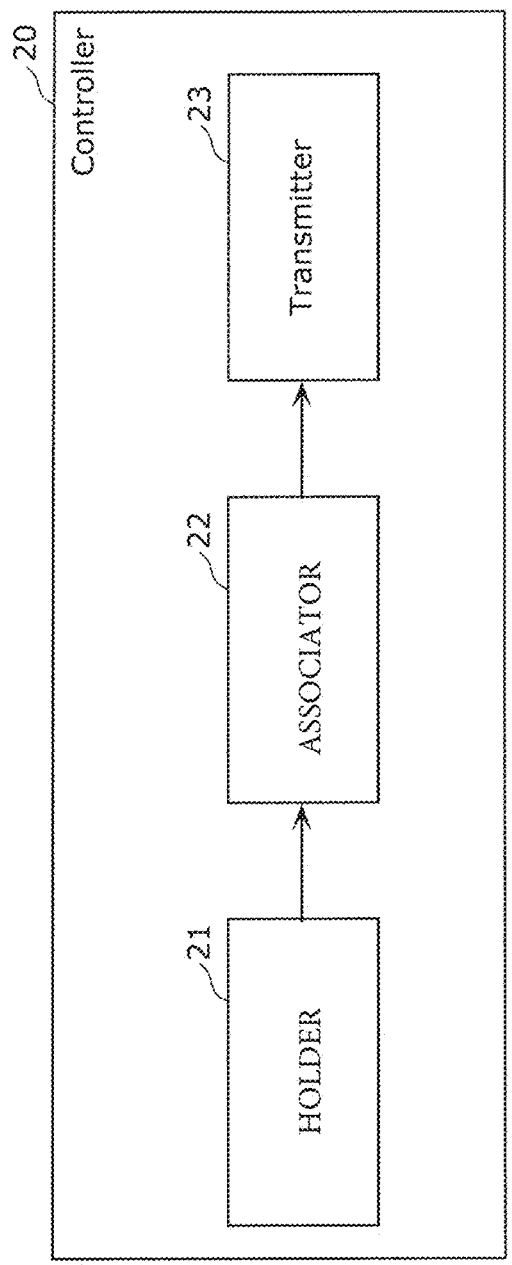
FIG. 4 is a block diagram illustrating a configuration of a controller according to Preferred Embodiment 1 of the present invention.

FIG. 4 is a block diagram illustrating a configuration of the controller 20 according to the present preferred embodiment.

As illustrated in FIG. 4, the controller 20 includes a holder 21, an associator 22, and a transmitter 23.

The holder 21 is a holder that holds one or more IP addresses that are to be assigned to conversion devices C.

The associator 22 is a processor that associates the one or more IP addresses held in the holder 21 with the MAC addresses (first MAC addresses) of the terminals T connected to the wired IFs 11 of the plurality of conversion devices C.

The associator 22 may associate one IP address to each of the plurality of conversion devices C, or may sequentially associate a single IP address to the plurality of conversion devices C. The details of the association method will be described later.

The transmitter 23 is a processor that transmits each of the one or more IP addresses held in the holder 21 in association with the first MAC address associated with this IP address by the associator 22. The transmitter 23 generates a set packet that is a communication packet including the above IP address and the first MAC address and transmits the generated set packet.

Figure 5:
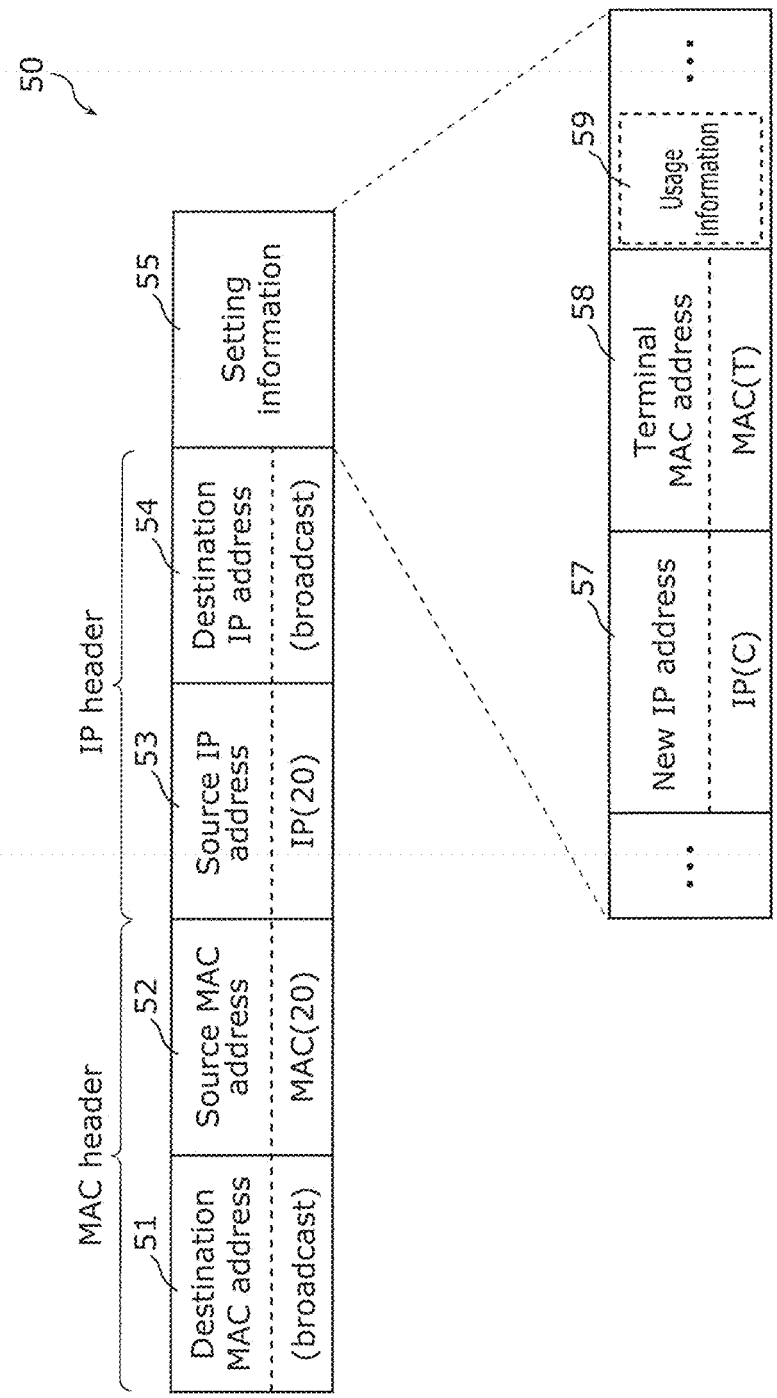
FIG. 5 is an explanatory diagram illustrating a set packet according to Preferred Embodiment 1 of the present invention.

FIG. 5 is an explanatory diagram illustrating a set packet 50 according to the present preferred embodiment. The set packet 50 illustrated in FIG. 5 is a set packet that is used by the controller 20 when setting an IP address to one conversion device C.

As illustrated in FIG. 5, the set packet 50 includes a destination MAC address field 51 and a source MAC address field 52 as fields included in a MAC header. The set packet 50 also includes a source IP address field 53, a destination IP address field 54, and a setting information field 55 as fields included in an IP header and a payload. The MAC header and the IP header further include other known fields, but description thereof is omitted.

The destination MAC address field 51 designates a broadcast address (ff:ff:ff:ff:ff:ff). Since a broadcast address is set in the destination MAC address field 51, the set packet 50 is able to be received by the conversion devices C. As described previously, there are cases where the controller 20 does not manage the MAC addresses of the conversion devices C, but even in such cases, there is the advantage that the conversion devices C is able to receive the set packet 50.

Note that the destination MAC address field 51 may designate the MAC address of the conversion device C. In this case, the set packet 50 is not transferred to other communication devices, and the effect of reducing the amount of communication on the network is achieved.

The source MAC address field 52 designates the MAC address (denoted as MAC(20)) of the controller 20.

The source IP address field 53 designates the IP address (denoted as IP(20)) of the controller 20.

The destination IP address field 54 designates a broadcast address (e.g., 255.255.255.255).

The setting information field 55 includes information for assigning an IP address to the conversion device C. Specifically, the setting information field 55 includes a new IP address field 57, a terminal MAC address field 58, and a usage flag 59.

The new IP address field 57 designates an IP address (denoted as IP(C)) that is to be assigned to the conversion device C in response to the set packet 50.

The terminal MAC address field 58 designates the MAC address of the terminal T that is connected to the wired IF 11 of the conversion device C, as information for identifying the conversion device C to which the IP address is assigned in response to the set packet 50.

The usage flag 59 is flag information that indicates whether the IP address assigned in response to the set packet is used temporarily or permanently. The usage flag 59 corresponds to the usage information. Note that the usage flag 59 is not absolutely necessary information.

FIG. 6 illustrates another form of the set packet according to the present preferred embodiment.

FIG. 6 is an explanatory diagram illustrating a set packet 50A according to the present preferred embodiment. The set packet 50A illustrated in FIG. 6 is a set packet that is used, instead of the set packet 50, when the controller 20 sets IP addresses to two conversion devices C1 and C2 connected to one terminal T. The set packet 50A is used in the network configuration illustrated in FIG. 2.

The set packet 50A includes two new IP address fields 57A and 57B that designate two IP addresses that are assigned respectively to the two conversion devices C1 and C2. The two new IP address fields 57A and 57B respectively designate IP addresses IP(C1) and IP(C2) that are assigned respectively to the conversion devices C1 and C2 in response to the set packet 50A. The other fields are similar to those described above, and a detailed description thereof is omitted.

Processing that is performed by the conversion device C with the configuration as described above will be described.

FIG. 7 is a flowchart illustrating the processing performed by the conversion device C according to the present preferred embodiment. The flowchart illustrated in FIG. 7 shows processing that is performed when the controller 20 sets an IP address to one conversion device C.

In step S101, the conversion device C acquires the MAC address of the terminal T. The acquired MAC address is retained as a terminal address 13A in the converter 13. Note that the method for acquiring the MAC address of the terminal T is not limited. For example, the MAC address of the terminal T may be acquired from the source MAC address in a communication frame actually received through the wired IF 11, or may be acquired by a notification received from, for example, the controller 20.

In step S201, the associator 22 of the controller 20 associates the IP address held in the holder 21 with the MAC address of the terminal T.

In step S202, a set packet 50 that includes the IP address and the MAC address associated by the associator 22 in step S201 is generated and transmitted.

In step S102, the wireless IF 12 of the conversion device C receives the set packet 50 transmitted from the controller 20.

In step S103, the controller 14 of the conversion device C determines whether the MAC address designated in the terminal MAC address field 58, which is included in the setting information field 55 of the set packet 50 received in step S102, is the same as the terminal address 13A retained by the converter 13, i.e., the MAC address of the terminal T that is connected to the wired IF 11 of the conversion device C. If they match, the processing proceeds to step S104. If it has been determined that they do not match, the set packet 50 is discarded and the processing ends.

In step S104, the controller 14 of the conversion device C sets the IP address designated in the new IP address field 57, which is included in the setting information field 55 of the set packet 50, as the IP address of the conversion device C. The IP address of the conversion device C is stored in at least the first storage area of the volatile memory 15. Whether or not to store the IP address of the conversion device C in the second storage area of the nonvolatile memory 16 is controlled by whether the IP address is used temporarily or permanently. That is, if the IP address is used temporarily, the IP address is not stored in the second storage area of the nonvolatile memory 16, and if the IP address is used permanently, the IP address is stored in the second storage area of the nonvolatile memory 16. Whether the IP address is used temporarily or permanently may be defined in advance by the conversion device C, or may be determined with the usage flag 59 of the set packet 50.

In step S105, the updater 17 of the conversion device C acquires an image file of firmware from the controller 20 through IP communication using the IP address set in step S104, and updates the firmware on the conversion device C.

When step S105 is completed, a series of processing in this flowchart ends.

Through this series of processing, the IP address can be properly assigned to the conversion device C in situations where the conversion device C is not assigned an IP address but the MAC address of the automated guided vehicle serving as the terminal T is managed.

As described above, the conversion device according to the present preferred embodiment can properly assign an IP address to itself in situations where the conversion device is not assigned an IP address but the MAC address of the communication terminal is managed. The conversion device is essentially a device that converts communication, and therefore may be operated in a state in which the conversion device is not assigned an IP address and its MAC address is also not managed. In that case, the controller has no information to individually identify the conversion device. In view of this, the MAC address of equipment that is connected to the wired interface of the conversion device is used as an identifier to set the IP address of the conversion device. Also, the controller intensively manages the IP address that is to be assigned to the conversion device, thus avoiding the possibility that processing and time for assigning an IP address will increase as in Japanese Unexamined Patent Application Publication No. 2010-239281. In this way, the conversion device is able to reduce communication required to set an IP address in comparison with that in conventional cases.

Also, the controller is able to determine whether the IP address assigned by the controller is used temporarily or permanently by the conversion device. In this way, there is an advantage that the controller is able to take the initiative to determine handling of the IP address.

Also, the conversion device is able to update firmware with the IP address assigned by the controller.

Moreover, the communication system according to the present preferred embodiment transmits an IP address that is to be assigned to the conversion device to the conversion device in association with the MAC address of the terminal that is connected to the conversion device. This allows the conversion device to use the MAC address of the terminal connected thereto as an identifier to acquire an IP address that is to be assigned to itself and to set this IP address.

Preferred Embodiment 2

The present preferred embodiment describes a conversion device or the like that is able to reduce communication required to set an IP address in comparison with that in conventional cases. In particular, the present preferred embodiment describes a method in which, in the case where there is a plurality of conversion devices, the controller 20 properly assigns IP addresses to the plurality of conversion devices.

A communication system 1 according to the present preferred embodiment is the same as the communication system according to Preferred Embodiment 1, and therefore description thereof is omitted (see FIGS. 1 and 2).

The associator 22 of the controller 20 according to the present preferred embodiment uses an address assignment table to associate the MAC address of the terminal T, which is connected to the wired IF 11 of each of the plurality of conversion devices C, with the IP address that is to be assigned to the conversion device C. The transmitter 23 transmits a set packet that includes a plurality of associated pairs of IP addresses and MAC addresses.

First, the address assignment table will be described.

FIG. 8 is an explanatory diagram illustrating an address assignment table 70 stored in the associator 22 of the conversion device C according to the present preferred embodiment. The address assignment table 70 illustrated in FIG. 8 is used to assign IP addresses to n conversion devices C. Here, n is assumed to be two or more.

As illustrated in FIG. 8, each entry (each row) of the address assignment table 70 includes a conversion device ID 71, a terminal MAC address 72, and a new IP address 73.

The conversion device ID 71 is an identifier for the conversion device C that is to be associated with the IP address in this entry.

The terminal MAC address 72 is the MAC address of the terminal that is identified by the conversion device ID 71 in this entry.

The new IP address 73 is an IP address that is to be assigned to the conversion device ID 71 in this entry.

For example, the uppermost entry of the address assignment table 70 indicates that the terminal with a MAC address "MAC(T1)" is connected to the wired IF 11 of the conversion device C with a conversion device ID "C1," and the IP address "IP(C1)" is assigned to this conversion device C. The same applies to the other entries.

Another form of the address assignment table will be described.

FIG. 9 is an explanatory diagram illustrating an address assignment table 70A stored in the controller according to the present preferred embodiment. The address assignment table 70A illustrated in FIG. 9 is an address assignment table that is used, instead of the address assignment table 70, when the controller 20 sets IP addresses to two conversion devices C1 and C2 connected to one terminal T. The address assignment table 70A is used in the network configuration illustrated in FIG. 2.

Each entry of the address assignment table 70A includes two new IP addresses 73A and 73B that are assigned respectively to the two conversion devices C1 and C2. The two new IP addresses 73A and 73B respectively designate IP addresses IP(C11) and IP(C12) that are to be assigned to the conversion devices C1 and C2.

Next, a set packet that is to be transmitted by the transmitter 23 will be described.

Figure 10:
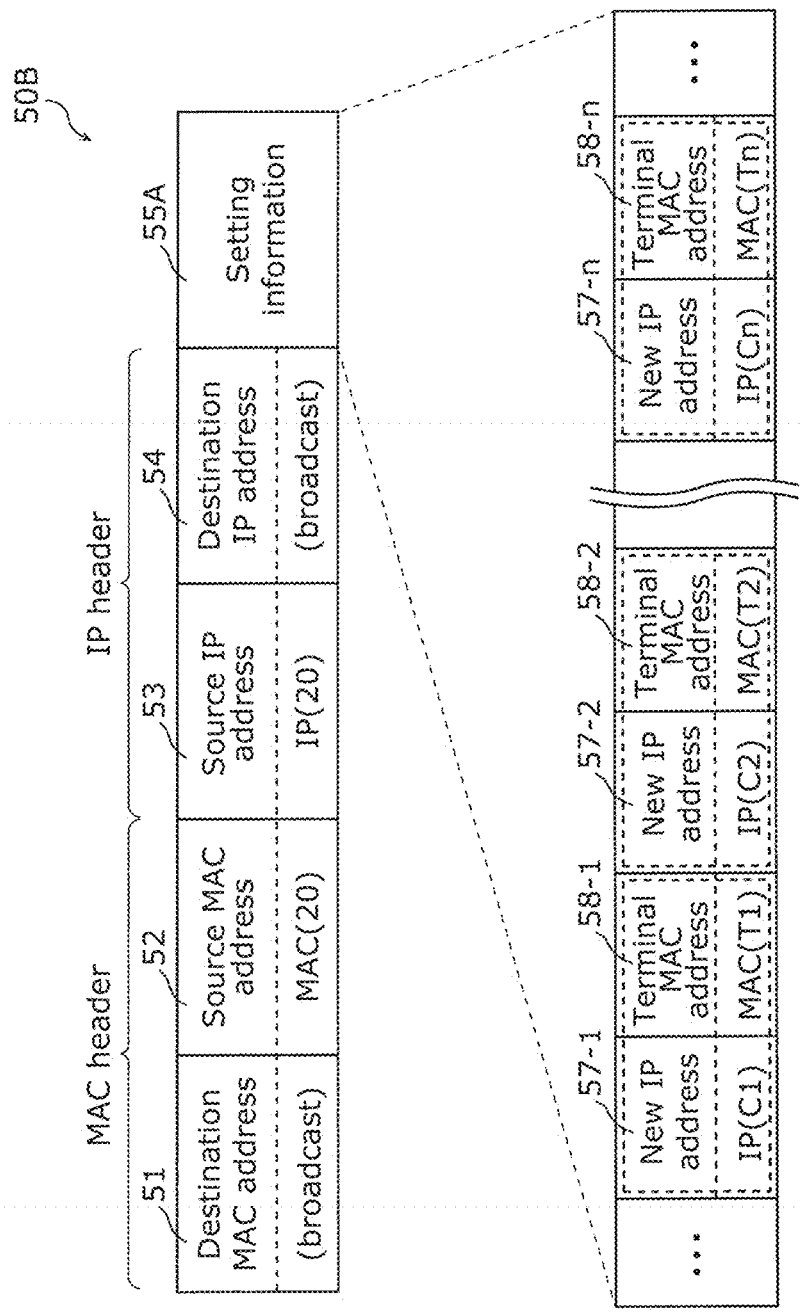
FIG. 10 is an explanatory diagram illustrating a set packet according to Preferred Embodiment 2 of the present invention.

FIG. 10 is an explanatory diagram illustrating a set packet 50B according to the present preferred embodiment.

As illustrated in FIG. 10, the set packet 50B has similar packet fields to those of the set packet 50 (see FIG. 5) or the set packet 50A (see FIG. 6) according to Preferred Embodiment 1. The set packet 50B differs from the set packet or 50A in that (1) the destination MAC address is a broadcast address and cannot be replaced by the MAC address of one conversion device C and that (2) the setting information field 55A includes a plurality of pairs of new IP addresses and terminal MAC addresses.

Specifically, the setting information field 55A includes n pairs, specifically, starting from the pair of a new IP address field 57-1 and a terminal MAC address field 58-1, the pair of a new IP address field 57-2 and a terminal MAC address field 58-2, . . . to the pair of a new IP address field 57-n and a terminal MAC address field 58-n. Note that if n is 1, the set packet 50B is the same as the set packet 50 according to Preferred Embodiment 1.

Since the destination MAC address in the set packet 50B cannot be replaced by the MAC address of one conversion device C, i.e., it is a broadcast address, as described in (1) above, the set packet 50B is able to be received by a plurality of conversion devices C.

Also, since the set packet 50B includes a plurality of pairs as described in (2) above, a plurality of conversion devices C can receive the set packet 50B in one transmission. This achieves an effect of reducing the amount of communication on the network in comparison with that in the case where individual set packets 50 are sequentially transmitted.

Typical examples of two forms of address assignment and firmware updating according to the present preferred embodiment will be described hereinafter. The first form is that different IP addresses are set to a plurality of conversion devices C, and firmware on these devices are updated in parallel. The second form is that a single IP address is sequentially set to a plurality of conversion devices C, and firmware is updated in series.

Figure 11:
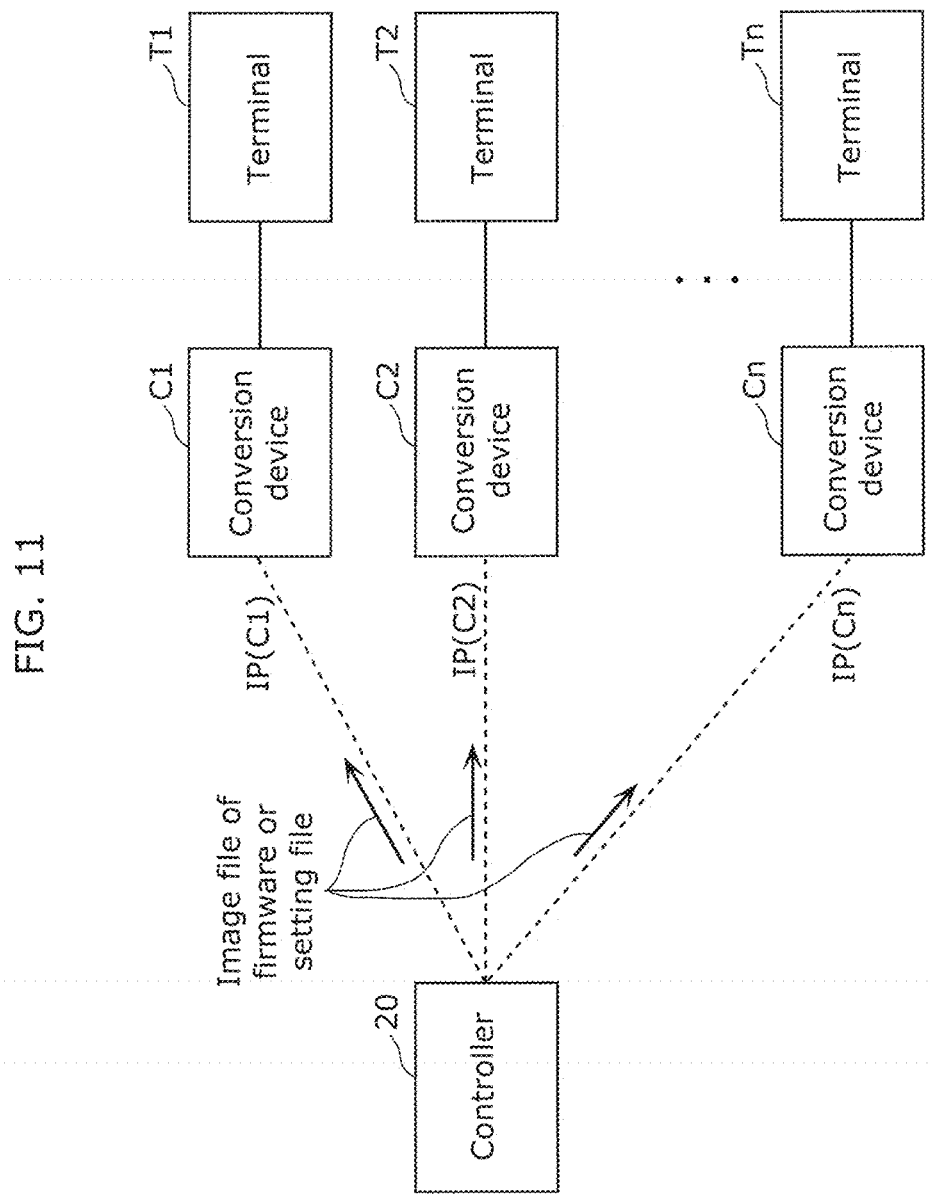
FIG. 11 is an explanatory diagram illustrating a first form of address assignment and firmware updating in a communication system according to Preferred Embodiment 2 of the present invention.

FIG. 11 is an exemplary diagram illustrating the first form of address assignment and firmware updating in the communication system 1 according to the present preferred embodiment.

The holder 21 of the controller 20 holds the same number of IP addresses, i.e., n IP addresses, as the number of conversion devices C as IP addresses that are to be assigned to the conversion devices C.

The associator 22 of the controller 20 uses the address assignment table 70 illustrated in FIG. 8 to establish associations in which a new IP address IP(C1) is assigned to a conversion device C1, a new IP address IP(C2) is assigned to a conversion device C2, . . . , and a new IP address IP(Cn) is assigned to a conversion device Cn. That is, the associator 22 associates the new IP address IP(C1) with the terminal MAC address MAC(T1), the new IP address IP(C2) with the terminal MAC address MAC(T2), . . . , and the new IP address IP(Cn) with the terminal MAC address MAC(Tn). In this way, the associator 22 of the controller 20 associates each of the IP addresses held in the holder 21 in a one-to-one relationship with the MAC address of the terminal T connected to the wired IF 11 of each of the plurality of conversion devices C.

Then, the transmitter 23 of the controller 20 transmits one communication packet that includes the plurality of IP addresses held in the holder 21 and the MAC addresses associated with this plurality of IP addresses by the associator 22. This communication packet corresponds to the set packet 50B (see FIG. 10) that includes pairs of new IP addresses and terminal MAC addresses associated by the associator 22.

The wireless IF 12 of each of the conversion devices C (C1, C2, . . . , and Cn) receives the set packet 50B. Then, the controller 14 of each conversion device C sets, as the terminal MAC address, the new IP address that is paired with the terminal MAC address 13A retained as the terminal MAC address in the converter 13 (i.e., the MAC address of the terminal T connected to the wired IF 11 of the conversion device C) as the IP address of the own conversion device C.

By assigning IP addresses in this way, each of the plurality of conversion devices C becomes capable of IP communication with the controller 20 by using the IP address. The controller 20 is able to transmit an image file of firmware on the conversion device C to each of the plurality of conversion devices C through IP communication.

Figure 12:
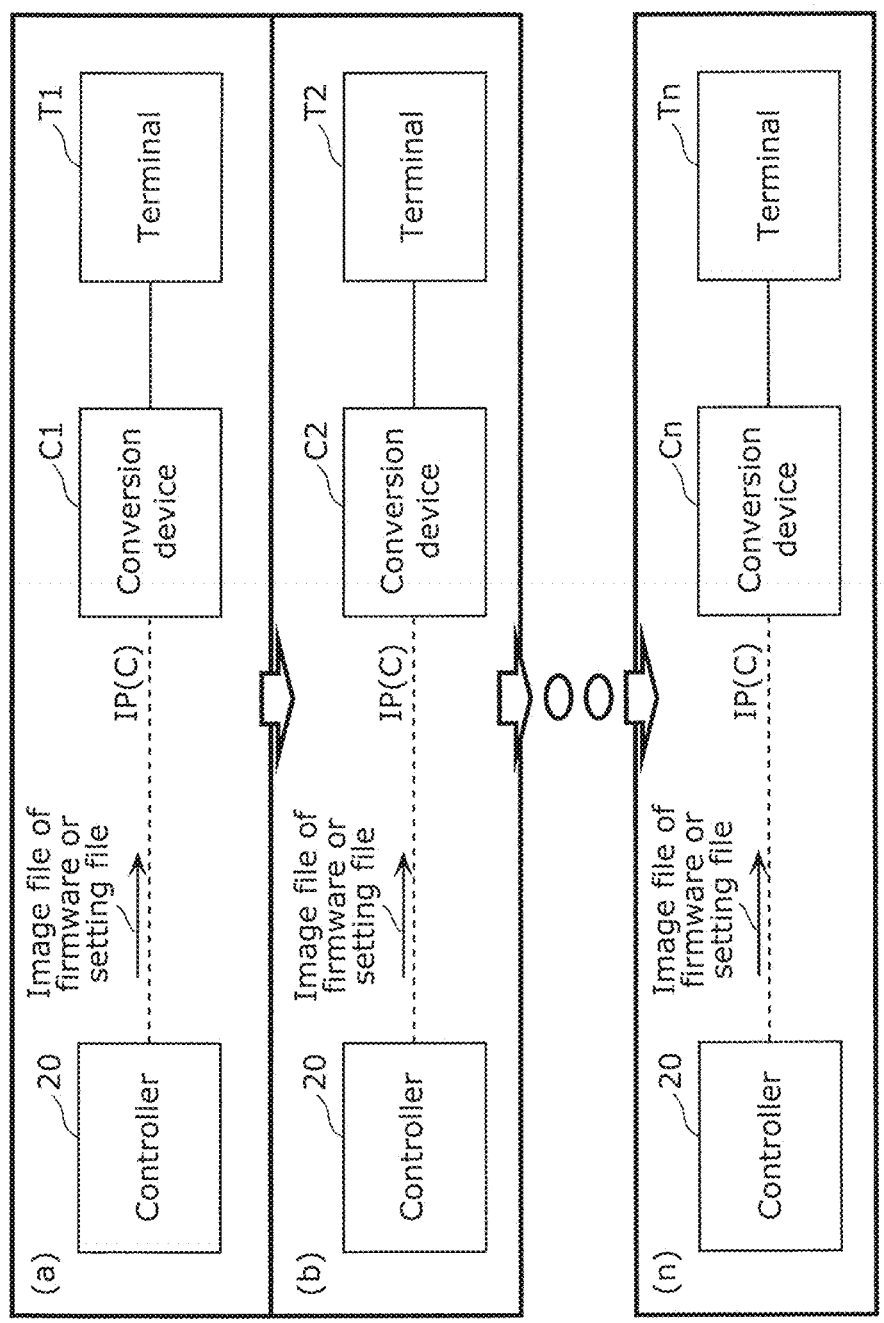
FIG. 12 is an explanatory diagram illustrating a second form of address assignment in the communication system according to Preferred Embodiment 2 of the present invention.

FIG. 12 is an exemplary diagram illustrating the second form of address assignment and firmware updating in the communication system 1 according to the present preferred embodiment.

The holder 21 of the controller 20 is assumed to hold a single IP address (denoted as IP(C)) as an IP address that is to be assigned to the conversion devices C.

First, the associator 22 of the controller 20 establishes an association in which the new IP address IP(C) is assigned to the conversion device C1 among the plurality of conversion devices C. That is, the associator 22 associates the new IP address IP(C) with the terminal MAC address MAC(T1).

Then, the transmitter 23 of the controller 20 transmits the set packet 50 or 50A that includes a pair of the new IP address and the terminal MAC address associated by the associator 22 (i.e., a set packet in which the terminal MAC address is denoted as MAC(T1) in FIG. 5 or 6). Note that the destination MAC address in this set packet 50 or 50A may be a broadcast address, or may be the address of the conversion device C1.

The wireless IF 12 of the conversion device C1 receives the set packet 50 or 50A. Then, the controller 14 of the conversion device C1 sets the new IP address IP(C) as the IP address of the conversion device C1.

The controller 20 transmits an image file of firmware to the conversion device C1 through IP communication using the IP address IP(C), and the updater 17 of the conversion device C1 updates the firmware (see (a) in FIG. 12).

After the updater 17 of the conversion device C1 has completed the updating of the firmware, the associator 22 of the controller 20 establishes an association in which the new IP address IP(C) is assigned to the conversion device C2 among the plurality of conversion devices C. That is, the associator 22 associates the new IP address IP(C) with the terminal MAC address MAC(T2).

Thereafter, the firmware on the conversion device C2 is updated in the same manner as described above (see (b) in FIG. 12). After the updating of the firmware on the conversion device C2 has been completed, the firmware on the other conversion devices C are updated, and ultimately the updating of the firmware on the conversion device Cn is completed (see (n) in FIG. 12).

In this way, a single IP address is shared and assigned to the plurality of conversion devices C. This allows each of the plurality of conversion devices C to sequentially receive an image file of firmware and update the firmware. Thus, the firmware on the plurality of conversion devices C is able to be updated with use of reduced number of IP addresses.

The second form is preferably used in operations in which the IP address is used temporarily. This is because the IP address is erased after the updater 17 has completed updating, without the need to perform any specific procedure or processing for erasing the IP address set to the conversion device C1. However, the second form may be used in operations in which the IP address is used permanently, as long as a specific procedure or processing for easing the set IP address is performed.

As described above, in the communication system according to the present preferred embodiment, each of a plurality of conversion devices is capable of IP communication with the controller by using the assigned IP address. The controller is able to transmit image files of firmware to each of the plurality of conversion devices in parallel through this IP communication.

Also, in the communication system, a plurality of IP addresses that are to be assigned to a plurality of conversion devices can be transmitted and set to the plurality of conversion devices in one packet transmission. This reduces the amount of communication on the network.

Also, in communication system, a single IP address is shared and assigned to a plurality of conversion devices. This allows each of the plurality of conversion devices to sequentially receive an image file of firmware and update the firmware. Thus, the firmware on the plurality of conversion devices C is able to be updated with use of reduced number of IP addresses.

While the conversion devices, communication systems, and related methods according to preferred embodiments of the present invention have been described above, the present invention is not intended to be limited to these preferred embodiments. The present invention also includes other variations obtained by applying various changes conceivable by a person skilled in the art to each preferred embodiment and obtained by any combinations of elements and functions described in each preferred embodiment without departing from the scope of the present invention.

Preferred embodiments of the present invention are applicable to conversion devices and communication systems and are able to reduce communication required to set an IP address in comparison with that in conventional cases.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A conversion device for interconversion of wired communication and wireless communication, the conversion device comprising:
 a wired interface;
 a wireless interface;
 a converter that retains a first media access control (MAC) address of a communication terminal that is connected to the wired interface, and converts wireless communication in which the communication terminal is a destination into wired communication and converts wired communication in which the communication terminal is a source for wireless communication between the wired interface and the wireless interface through the first MAC address; and
 a controller that (a) receives a communication packet including an internet protocol (IP) address and a second MAC address through the wireless interface, and (b) when the second MAC address included in the received communication packet is the same as the first MAC address, sets the IP address included in the communication packet received by the controller as an IP address of the conversion device.

2. The conversion device according to claim 1, further comprising:
 a volatile memory that includes a first storage area to store an IP address that is being used for IP communication by the conversion device; and
 a nonvolatile memory that includes a second storage area to store an IP address that is read at startup of the conversion device and used for IP communication by the conversion device after the startup; wherein
 in (a), the controller receives the communication packet that further includes usage information indicating whether the IP address included in the communication packet is used temporarily or permanently; and
 in (b):
 (c) when the usage information indicates that the IP address is used temporarily, the controller stores the second MAC address in only the first storage area out of the first storage area and the second storage area; and
 (d) when the usage information indicates that the IP address is used permanently, the controller stores the second MAC address in both of the first storage area and the second storage area.

3. The conversion device according to claim 1, further comprising an updater to receive an image file of firmware on the conversion device through IP communication using the IP address set by the controller and restart the conversion device after receipt of the image file to cause the conversion device to operate in accordance with the firmware based on the image file received by the updater.

4. The conversion device according to claim 1, further comprising an updater configured to receive a setting file of the conversion device through IP communication using the IP address set by the controller, update setting data on the conversion device after receipt of the setting file, and restart the conversion device to cause the conversion device to operate in accordance with settings in the setting file received by the updater.

5. A communication system comprising:
a plurality of conversion devices, each of which is the conversion device according to claim 1; and
a controller; wherein
the controller holds one or more IP addresses that are to be assigned to the plurality of the conversion devices; and
the controller includes:
an associator to associate the one or more IP addresses held in the controller with the first MAC addresses of the communication terminals connected to the wired interfaces of the plurality of the conversion devices; and
a transmitter to transmit each of the one or more IP addresses held in the controller and the first MAC address that is associated with the one or more IP addresses by the associator.

6. The communication system according to claim 5, wherein
the controller holds at least a same number of IP addresses as a number of the plurality of the conversion devices as the one or more IP addresses; and
the associator associates the same number of IP addresses held in the controller in a one-to-one relationship with the first MAC addresses of the communication terminals connected to the wired interface of each of the plurality of the conversion devices.

7. The communication system according to claim 6, wherein the transmitter transmits, as the communication packet, one communication packet that includes a plurality of IP addresses, among the same number of IP addresses held in the controller, and the first MAC addresses that are associated with the plurality of IP addresses by the associator.

8. The communication system according to claim 5, wherein
the controller holds one IP address as the one or more IP addresses;
the associator associates the one IP address held in the controller with one conversion device among the plurality of conversion devices;
the transmitter transmits the one IP address held in the controller and the first MAC address that is associated with the one IP address by the associator to cause the transmitted one IP address to be stored in a storage area of a volatile memory of the one conversion device; and
after an image file of firmware on the one conversion device is transmitted through IP communication using the one IP address, and the one conversion device is restarted and operated in accordance with the firmware, the associator associates the one IP address held in the controller with a conversion device different from the one conversion device among the plurality of conversion devices.

9. A method for controlling a conversion device for interconversion of wired communication and wireless communication, the method comprising:
a conversion step, by using a first MAC address of a communication terminal connected to a wired interface, converting wireless communication in which the communication terminal is a destination into wired communication and converting wired communication in which the communication terminal is a source into wireless communication between the wired interface and a wireless interface; and
a control step of (a) receiving a communication packet that includes an IP address and a second MAC address through the wireless interface, and (b) when the second MAC address included in the communication packet is the same as the first MAC address, setting the IP address included in the received communication packet as an IP address of the conversion device.

10. The method for controlling a communication system according to claim 9, further comprising:
a holding step of holding one or more IP addresses that are to be assigned to a plurality of the conversion devices;
an association step of associating the one or more IP addresses held in the holding step with the first MAC addresses of the communication terminals connected to the wired interfaces of the plurality of the conversion devices; and
a transmission step of transmitting each of the one or more IP addresses held in the holding step and the first MAC address that is associated with this IP address in the association step.

* * * * *